US007136963B2

(12) United States Patent
Ogawa et al.

(10) Patent No.: US 7,136,963 B2
(45) Date of Patent: Nov. 14, 2006

(54) STORAGE CAPABLE OF CACHE ASSIGNMENT MODIFICATION

(75) Inventors: Junji Ogawa, Yokohama (JP); Naoto Matsunami, Hayama-machi (JP); Akira Nishimoto, Sagamihara (JP); Yoichi Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 35 days.

(21) Appl. No.: 10/863,426

(22) Filed: Jun. 7, 2004

(65) Prior Publication Data

US 2005/0216659 A1 Sep. 29, 2005

(30) Foreign Application Priority Data

Mar. 26, 2004 (JP) ............................. 2004-092960

(51) Int. Cl.
*G06F 12/00* (2006.01)
(52) U.S. Cl. .................. 711/113; 711/114; 711/119
(58) Field of Classification Search ................... None
See application file for complete search history.

(56) References Cited

U.S. PATENT DOCUMENTS

| 5,771,367 A | 6/1998 | Beardsley et al. |
| 5,987,569 A * | 11/1999 | Takahashi et al. .......... 711/119 |
| 6,073,218 A * | 6/2000 | DeKoning et al. .......... 711/150 |
| 6,381,674 B1 | 4/2002 | DeKoning et al. |
| 6,425,049 B1 * | 7/2002 | Yamamoto et al. ......... 711/112 |
| 6,477,619 B1 * | 11/2002 | Fujimoto et al. ........... 711/114 |
| 6,757,790 B1 | 6/2004 | Chalmer et al. |
| 6,792,505 B1 | 9/2004 | Otterness et al. |
| 2002/0046321 A1 * | 4/2002 | Kanai et al. ................ 711/113 |
| 2003/0101317 A1 | 5/2003 | Mizuno et al. |
| 2003/0135808 A1 * | 7/2003 | Kakuta et al. .............. 714/768 |

FOREIGN PATENT DOCUMENTS

JP 2003-162377 6/2003

* cited by examiner

*Primary Examiner*—Matthew Kim
*Assistant Examiner*—Michael Krofcheck
(74) *Attorney, Agent, or Firm*—Townsend and Townsend and Crew LLP

(57) ABSTRACT

To provide a storage system which enables usage of a greater volume of cache than that of a cache memory provided to a disk array control unit, including a first disk array control unit, a second disk array control unit, a plurality of disks, and a disk array control unit communication path between a first data transfer control unit and a second data transfer control unit, wherein the first data transfer control unit selectively sets either a first path through a first host input/output control unit, the first data transfer control unit, and a first disk input/output control unit, or a second path through the first host input/output control unit, the first data transfer control unit, the disk array control unit communication path, the second data transfer control unit, and a second disk input/output control unit, and then processes a data input/output request from a host.

6 Claims, 13 Drawing Sheets

FIG. 6

CACHE MEMORY 1 MANAGEMENT INFORMATION

| # | ACTUAL ADDRESS | STATUS | ····· |
|---|---|---|---|
| 1 | 0x0000 | CLEAN | |
| 2 | 0x0100 | CLEAN | |
| 3 | 0x0200 | DIRTY | |
| 33 | 0x3200 | DIRTY | |
| 34 | 0x3300 | DIRTY | |
| 35 | 0x3400 | DIRTY | |
| ⋮ | ⋮ | ⋮ | ⋮ |

~2011

CACHE MEMORY 2 MANAGEMENT INFORMATION

| # | ACTUAL ADDRESS | STATUS | ····· |
|---|---|---|---|
| 123 | 0x0000 | CLEAN | |
| 456 | 0x0100 | CLEAN | |
| 789 | 0x0200 | DIRTY | |
| 1204 | 0x3200 | DIRTY | |
| ⋮ | ⋮ | ⋮ | ⋮ |

~2021

STORAGE CAPABLE OF CACHE ASSIGNMENT MODIFICATION

CLAIM OF PRIORITY

The present application claims priority from Japanese application 2004-92960 filed on Mar. 26, 2004, the content of which is hereby incorporated by reference into this application.

BACKGROUND

The present invention relates to a storage system, and more particularly to a disk array system having a plurality of disk array control units.

As the capacity of storage systems increases, there are cases where many volumes which were dispersed conventionally are handled as one storage to integrate the storage system. In such cases, volumes with various access patterns are mixed within a single storage system. Thus, accesses may concentrate on a specific volume, and that volume must be capable of high-level performance.

A method has been proposed, which is used for taking over the volumes between controllers to reduce the load. Specifically, a disk array system is proposed in which a switch-source controller writes data from the relevant volume in a data cache onto a disk and the coherence of the disk is preserved. Accordingly, even in a case where each controller is provided with an independent dedicated cache, any volume area can be taken over by any controller, without interrupting the system. (refer to JP 2003-162377

SUMMARY

In the conventional techniques for a storage system as mentioned above, resources are assigned to each of the controllers, which have a CPU, a memory, a cache memory, an interface (I/F), and the like. Management of the volume assigned to each of the controllers produces a performance advantage in that exclusion logic for the shared resources is not necessary. However, even when the cache memory in a controller is not at full capacity, the cache memory in the other controller cannot be used. Thus, no controller could use more cache than the cache memory size provided to the controller itself.

An object of the present invention is to enable usage of more cache than the capacity of the cache memory provided to a controller.

According to the present invention, there is provided a storage system including a first disk array control unit, a second disk array control unit, and a plurality of disks, the first disk array control unit comprising a first host input/output control unit that sends and receives data and control signals to/from a host connected to the storage system, a first disk input/output control unit that sends and receives data and control signals to/from the disks, and a first data transfer control unit that controls data transfer between the first host input/output control unit and the first disk input/output control unit, the second disk array control unit comprising a second host input/output control unit that sends and receives data and control signals to/from the host connected to the storage system, a second disk input/output control unit that sends and receives data and control signals to/from the disks, and a second data transfer control unit that controls data transfer between the second host input/output control unit and the second disk input/output control unit, the storage system further comprising a disk array control unit communication path connected so as to enable communications between the first data transfer control unit and the second data transfer control unit, the first data transfer control unit selectively setting one of a first path through the first host input/output control unit, the first data transfer control unit, and the first disk input/output control unit, and a second path through the first host input/output control unit, the first data transfer control unit, the disk array control unit communication path, the second data transfer control unit, and the second disk input/output control unit, and processes a data input/output request from the host.

According to the present invention, it is possible to use a cache memory having a larger capacity than that of a cache memory provided to a disk array control unit.

BRIEF DESCRIPTION OF THE DRAWINGS

FIG. 6 is an explanatory diagram of the cache memory management information according to the embodiment of the present invention.

DETAILED DESCRIPTION OF THE PREFERRED EMBODIMENTS

Below, explanation is given regarding an embodiment of the present invention, with reference made to the drawings.

Figure 1:
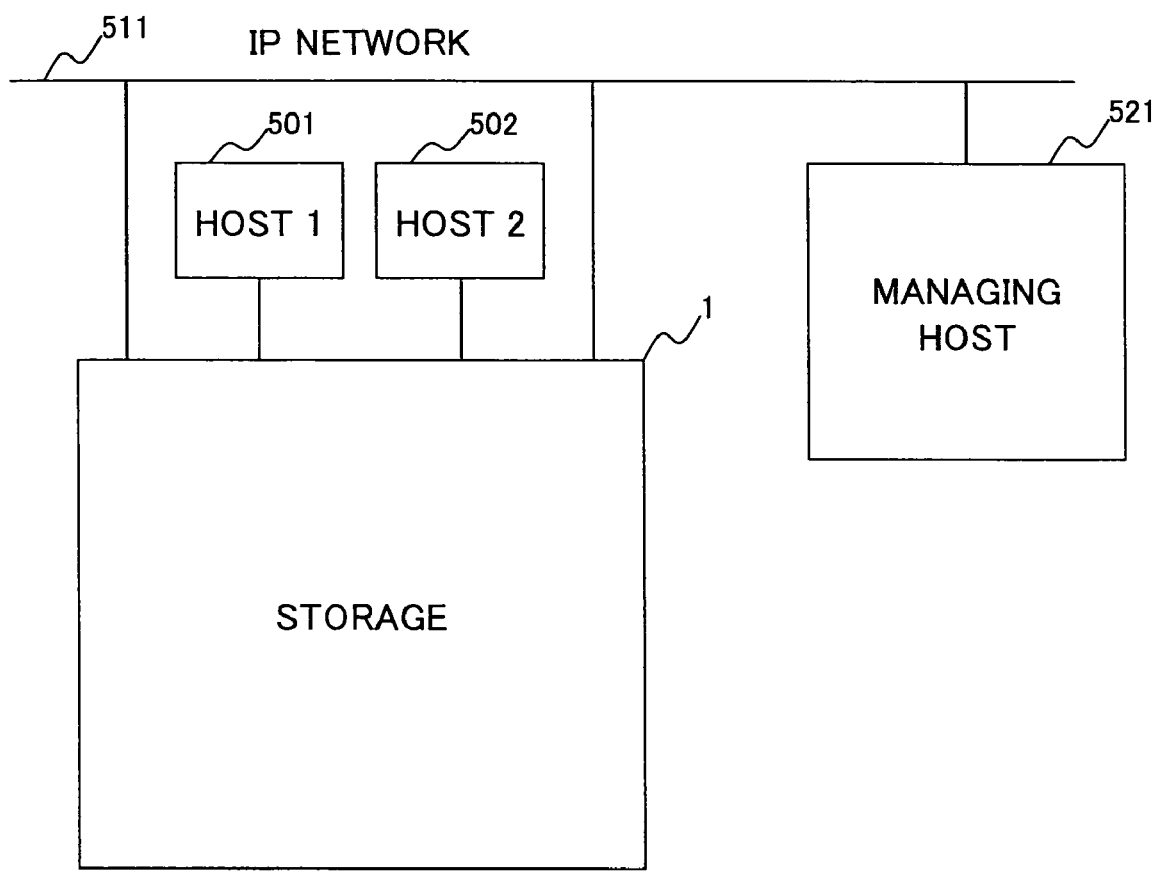
FIG. 1 is constructional diagram of a computer system with a storage system according to an embodiment of the present invention connected thereto.

FIG. 1 is a constructional diagram of a computer system with a storage system according to an embodiment of the present invention connected thereto.

A storage system 1 according to this embodiment is connected to a managing host 521 via an IP network 511. Furthermore, the storage system 1 is connected to a plurality of hosts 501, etc. via a SAN.

The hosts 501, 502 are computer devices, each of which has a CPU, a memory, a storage system, an interface, an input device, and a display device, and uses data provided from the storage system 1 to enable usage of a database service, web service, etc. The storage system 1 and the hosts 501, etc. are connected through the SAN. The SAN is a network that enables communications via a protocol suited for data transfer, such as Fibre Channel Protocol, or iSCSI (internet SCSI).

The IP network 511 uses TCP/IP protocol to enable communication of data and control information with the computer. For example, the IP network 511 may use Ethernet.

The managing host 521 is a computer device that is provided with a CPU, a memory, a storage system, an interface, an input device, and a display device. A management program operates on the managing host 521, and the management program is used to observe the operation status of the storage system 1, and control operations of the storage system 1. It should be noted that, a web browser and other client programs operate on the managing host 521. It is also possible to control the operations of the storage system 1 with a management program (Common Gateway Interface, Java, etc.) supplied from the storage system 1.

Figure 2:
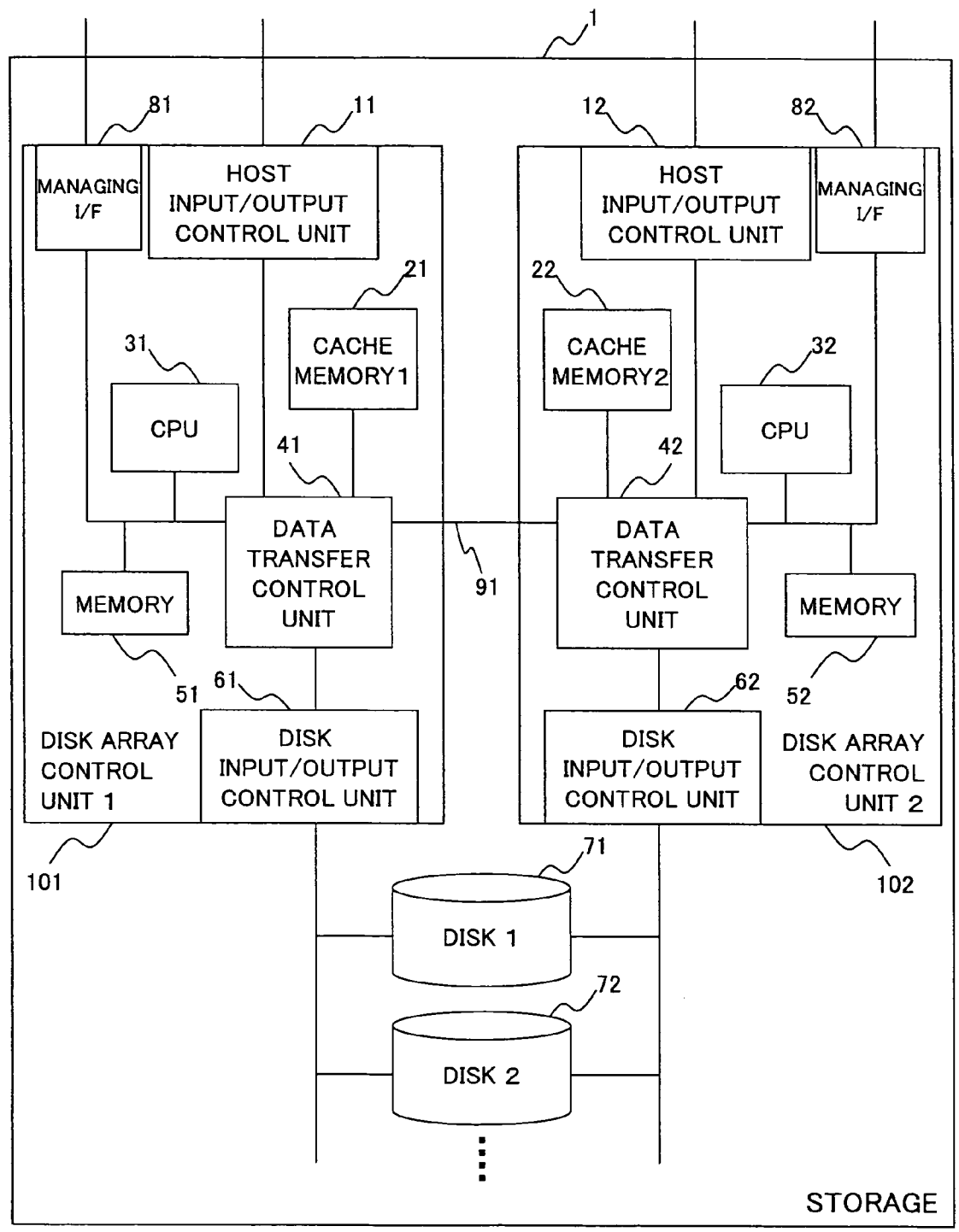
FIG. 2 is a block diagram showing a construction of the storage system according to the embodiment of the present invention.

FIG. 2 is a block diagram showing a construction of the storage system according to the embodiment of the present invention.

The storage system of this embodiment is constituted by a plurality of disk array control units (disk array control units 1, 2) and a plurality of disks (disks 1, 2).

The disk array control unit 101 is provided with a host input/output control unit 11, a cache memory 21, a CPU 31, a data transfer control unit 41, a memory 51, a disk input/output control unit 61, and a managing I/F 81. The disk array control unit 102 is provided with a host input/output control unit 12, a cache memory 22, a CPU 32, a data transfer control unit 42, a memory 52, a disk input/output control unit 62, and a managing I/F 82.

The host input/output control unit 11 is an interface to the hosts 501, etc., and may use, for example, Fibre Channel Protocol or iSCSI to send and receive data and control signals to/from the hosts 501, etc. The host input/output control unit 11 also converts a protocol used outside the storage system and a protocol used inside the storage system one another.

The cache memory 21 temporarily stores data that is sent and received between the host input/output control unit 11 and the disk input/output control unit 61.

The data transfer control unit 41 transfers data between the CPU 31, the host input/output control unit 11, the disk input/output control unit 61, and the cache memory 21. Furthermore, a check code is added to the data to be transferred to check the data.

A control program is stored in the memory 51, and the CPU 31 calls and executes the control program, whereby various processing is performed. Furthermore, the management information of the cache memory 21 is also stored in the memory 51.

The disk input/output control unit 61 is an interface to disks 71, 72, etc. For example, ATA, SAS (Serial Attached SCSI), Fibre Channel Protocol, or other such interface is used to send and receive data and control signals to/from the disks 71, etc. The disk input/output control unit 61 also converts a protocol used outside the disk array control device and a protocol used inside the disk array control device into one another.

In other words, data which the hosts 501, etc. read and write to/from the disks 71, etc. is transferred between the input/output control units 11 and 61 by the data transfer control unit 41. This data is further transferred to the cache memory 21. Further, the data transfer control unit 41 transfers data to the data transfer control unit 42 of another disk array control unit 102.

The managing interface 81 is an interface to the IP network 511, and uses TCP/IP protocol to send and receive data and control signals to/from the managing host 521.

The foregoing was an explanation of the disk array control unit 101, but the disk array control unit 102 also has a similar construction.

The data transfer control unit 41 of the disk array control unit 101, and the data transfer control unit 42 of the disk array control unit 102, are connected by means of a disk array control unit communication path 91, and data can also be transferred between the data transfer control unit 41 and the data transfer control unit 42. The disk array control unit communication path 91 can also be achieved by means of a signal line directly connecting the data transfer control unit 41 and the data transfer control unit 42, or by means of a signal line (such as a network) that is provided outside the storage system 1.

Figure 3:
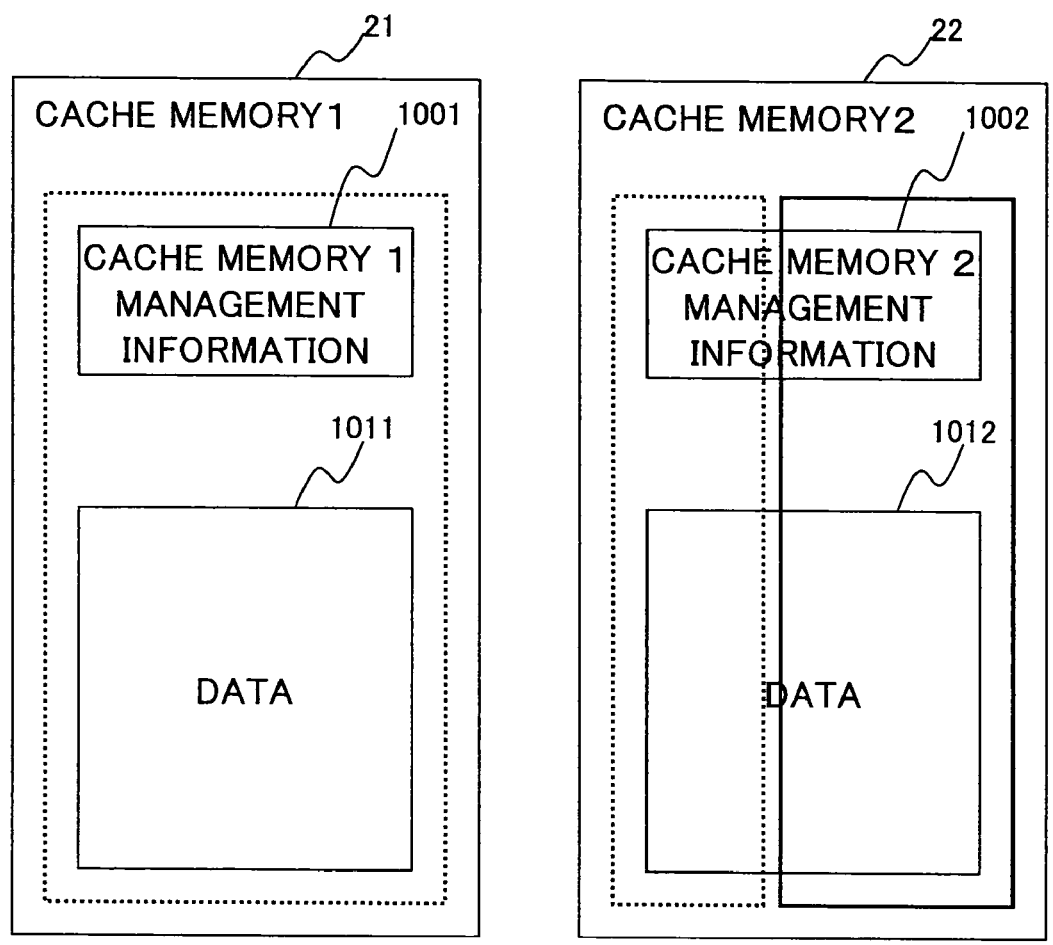
FIG. 3 is a constructional diagram of a cache memory according to the embodiment of the present invention.

FIG. 3 is a constructional diagram of the cache memory according to the embodiment of the present invention.

As described above, the cache memory 21 is provided with a data area 1011 that stores data sent and received between the host input/output control unit 11 and the disk input/output control unit 61 (i.e., the data read and written to/from the disks 71, etc.).

Furthermore, the cache memory 21 is provided with a cache memory management information area 1001 that stores an address of the data stored in the data area 1011, and status of the data (i.e., dirty data or clean data).

The disk array control unit 101 and the disk array control unit 102 can use each other's cache memory 21, 22 as their own cache memory. In FIG. 3, an area indicated by a broken line is the area used by the disk array control unit 101, and an area indicated by a thick line is the area used by the disk array control unit 102. That is, in the state shown in the diagram, the disk array control unit 101 is using a portion of the cache memory 22 as its own cache memory.

In an initial state when the storage system 1 is booted, the disk array control units 101, 102 each use their own cache memories 21, 22. After that, when there is no empty area in the cache memory 21 and there is empty area in the cache memory 22, the storage area of the cache memory 22 is assigned to the disk array control unit 101. It should be noted that, when the cache memory has been newly assigned, it is written into the cache memory management information that there is empty area, and the storage area inside the newly assigned cache memory is connected to an empty queue.

Figure 4:
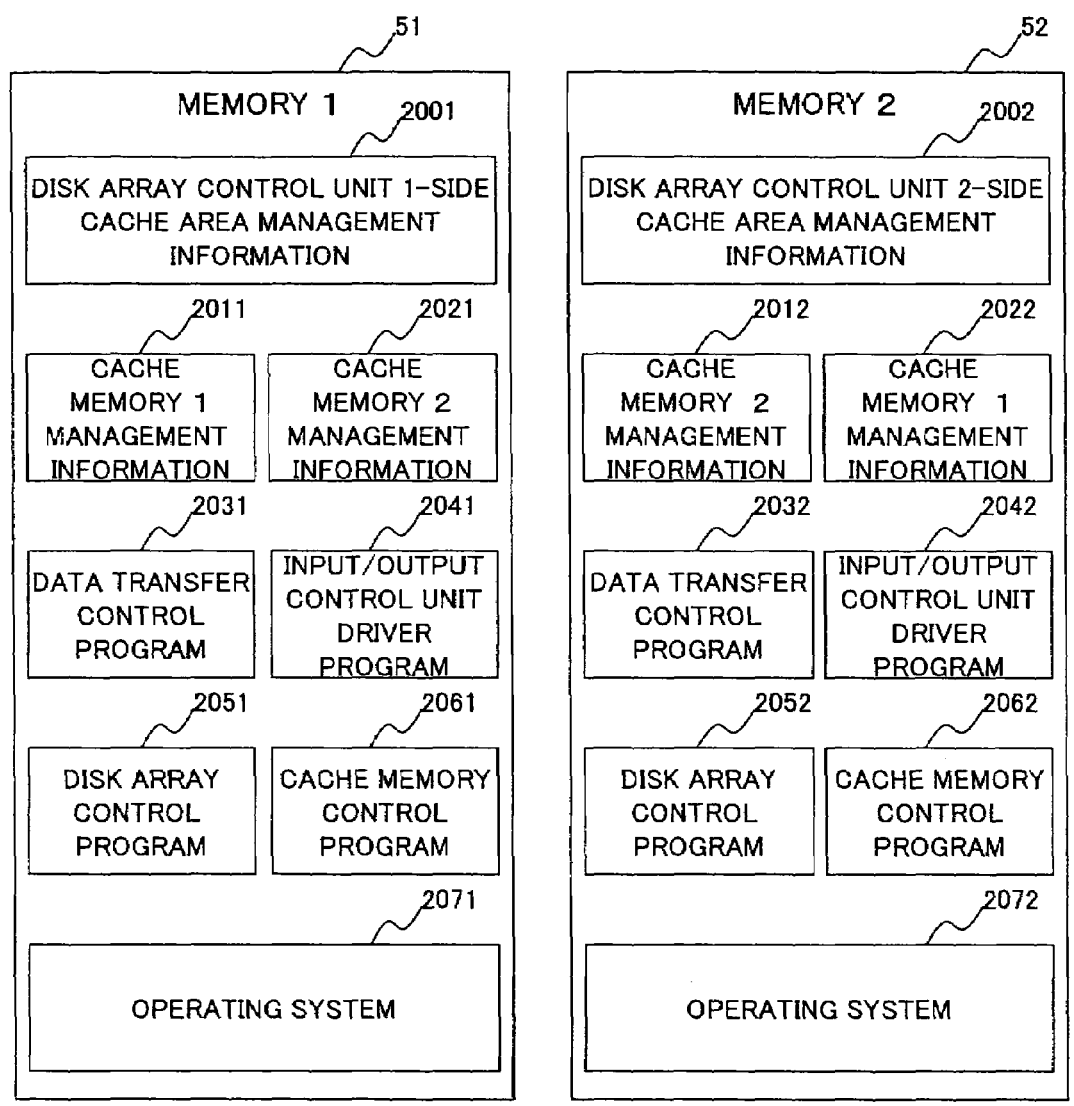
FIG. 4 is a constructional diagram of a memory according to the embodiment of the present invention.

FIG. 4 is a constructional diagram of the memory 51 according to the embodiment of the present invention.

As described above, the control program is stored in the memory 51, and the control program is executed by the CPU 31 to realize various processing. Specifically, the memory 51 stores disk array control unit 1-side cache area management information 2001, cache memory 1 management information 2011, cache memory 2 management information 2021, a data transfer control program 2031, an input/output control unit driver program 2041, a disk array control program 2051, a cache memory control program 2061, and an operating system 2071.

Figure 5:
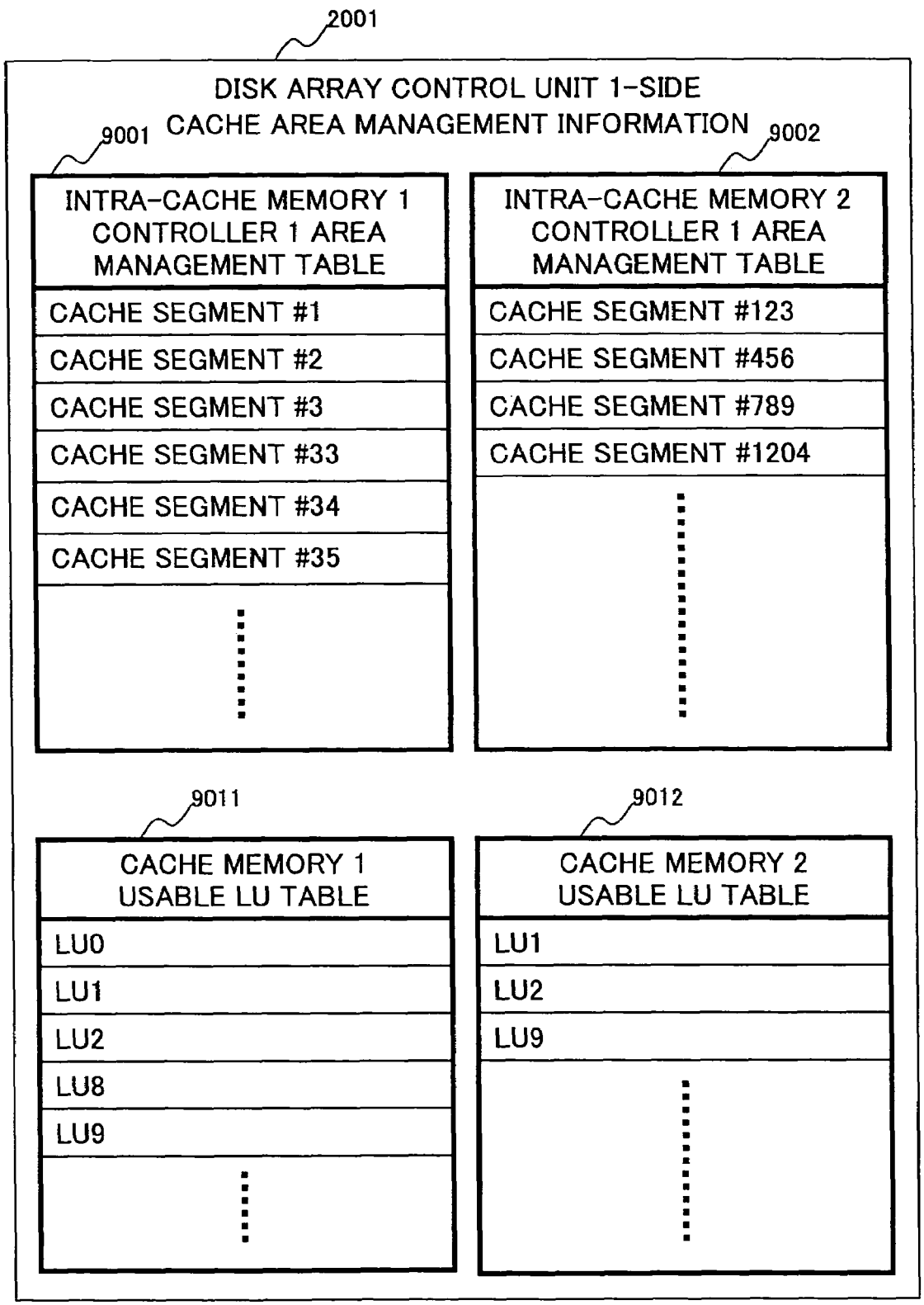
FIG. 5 is a constructional diagram of disk array control unit 1-side cache area management information, according to the embodiment of the present invention.

The disk array control unit 1-side cache area management information 2001 registers segments of the cache memory in a disk array control unit area management table, to manage the assignment of the cache memory for each disk array control unit (see FIG. 5).

The cache memory 1 management information 2011 and the cache memory 2 management information 2021 store information relating to the data stored in usable cache memory areas (segments) (see FIG. 6).

The data transfer control program 2031 is a program for operating the data transfer control unit 41 to transfer data.

The input/output control unit driver program 2041 is a program for operating the host input/output control unit 11 and the disk input/output control unit 61.

The disk array control program 2051 performs RAID conversion, logical-physical conversion, and other disk array controls, and reads and writes data to/from the disk 71, etc. according to data input/output requests from the hosts 501, etc., and thus comprises the disk input/output control unit.

The cache memory control program 2061 manages which data is stored in which cache memory, manages which cache memory to store the data into, and thus constitutes a cache memory control unit.

FIG. 5 is a constructional diagram of the disk array control unit 1-side cache area management information 2001 according to the embodiment of the present invention.

The disk array control unit 1-side cache area management information 2001 is provided with an intra-cache memory 1 controller 1 area management table 9001, an intra-cache memory 2 controller 1 management table 9002, a cache memory 1 usable LU table 9011, and a cache memory usable LU table 9012.

The cache memory is divided into segments according to given capacity (e.g., every 512 bytes), and the data is read and written per segment unit. In other words, the cache memory segments are the smallest unit of management.

The intra-cache memory 1 controller 1 area management table 9001 manages the area inside the cache memory 1 (21), which is managed by the disk array control unit 1 (101). That is, the cache memory segments written in this table are managed by the disk array control unit 1. Similarly, the intra-cache memory 2 controller 1 area management table 9002 manages the area inside the cache memory 2 (22), which is managed by the disk array control unit 1. That is, the cache memory segments written in this table are managed by the disk array control unit 1.

Although omitted in the figures, it should be noted that, disk array control unit 2-side cache area management information 2002, which is provided to the disk array control unit 2 (102), is provided with an intra-cache memory 2 controller 2 area management table that manages the area inside the cache memory 2 (22) that is managed by the disk array control unit 2, and an intra-cache memory 1 controller 2 area management table for managing the area inside the cache memory 1 (21) that is managed by the disk array control unit 2.

The area in the cache memory 1 (21) is registered into either the intra-cache memory 1 controller 1 area management table 9001, or the intra-cache memory 1 controller 2 area management table. Depending on which table the segment is registered in, a logical partition 8000 is modified, and the assignment of the cache memory 1 is determined for each controller.

Similarly, the area in the cache memory 2 (22) is registered into either the intra-cache memory 2 controller 1 area management table 9002, or the intra-cache memory 2 controller 2 area management table. Depending on which table the segment is registered in, the logical division is modified, and the assignment of the cache memory 2 is determined for each controller.

In the cache memory 1 usable LU table 9011, there are registered LUs for which data can be written into the cache memory 1 (21) that is managed by the disk array control unit 1 (101). That is, the cache memory 1 usable LU table 9011 registers all the LUs for which data can be read and written by the disk array control unit 1.

Similarly, the cache memory 2 usable LU table 9012 registers the LUs for which data can be written into the cache memory 2 (22), which is managed by the disk array control unit 1 (101). That is, the LUs which are registered in the cache memory 2 usable LU table 9012 can be used for the cache memory of another system, and the LUs that are not registered in the cache memory 2 usable LU table 9012 can be used only for the cache memory of their own system, and the cache memory of another system cannot be used.

In this way, the cache memory assignments are controlled according to the LU, whereby the cache memory of another system can be assigned to logical units where high-level performance is required, thus ensuring high-level access performance.

FIG. 6 is a diagram explaining the cache memory management information according to the embodiment of the present invention.

The disk array control unit 1 (101) is provided with the cache memory 1 management information 2011 and the cache memory 2 management information 2021.

The cache memory 1 management information 2011 defines information relating to the data stored in the segment defined in the intra-cache memory 1 controller 1 area management table 9001. More specifically, an actual address of the given segment in the cache memory, the state (status) of the data stored in the given segment, and a disk address of the data stored in the given segment are recorded here.

The status column records whether the data stored in the cache memory is clean data or dirty data. The clean data means that the same data stored in the cache memory is also stored on the disk. The dirty data means that there was a request to write the data into the storage system 1 and data relevant to the write request has been stored in the cache memory but the data has not been written to the disk yet.

It should be noted that, the cache memory 2 management information 2021 similarly defines information relating to the data stored in the segment stated in the intra-cache memory 2 controller 1 area management table 9002.

Figure 7:
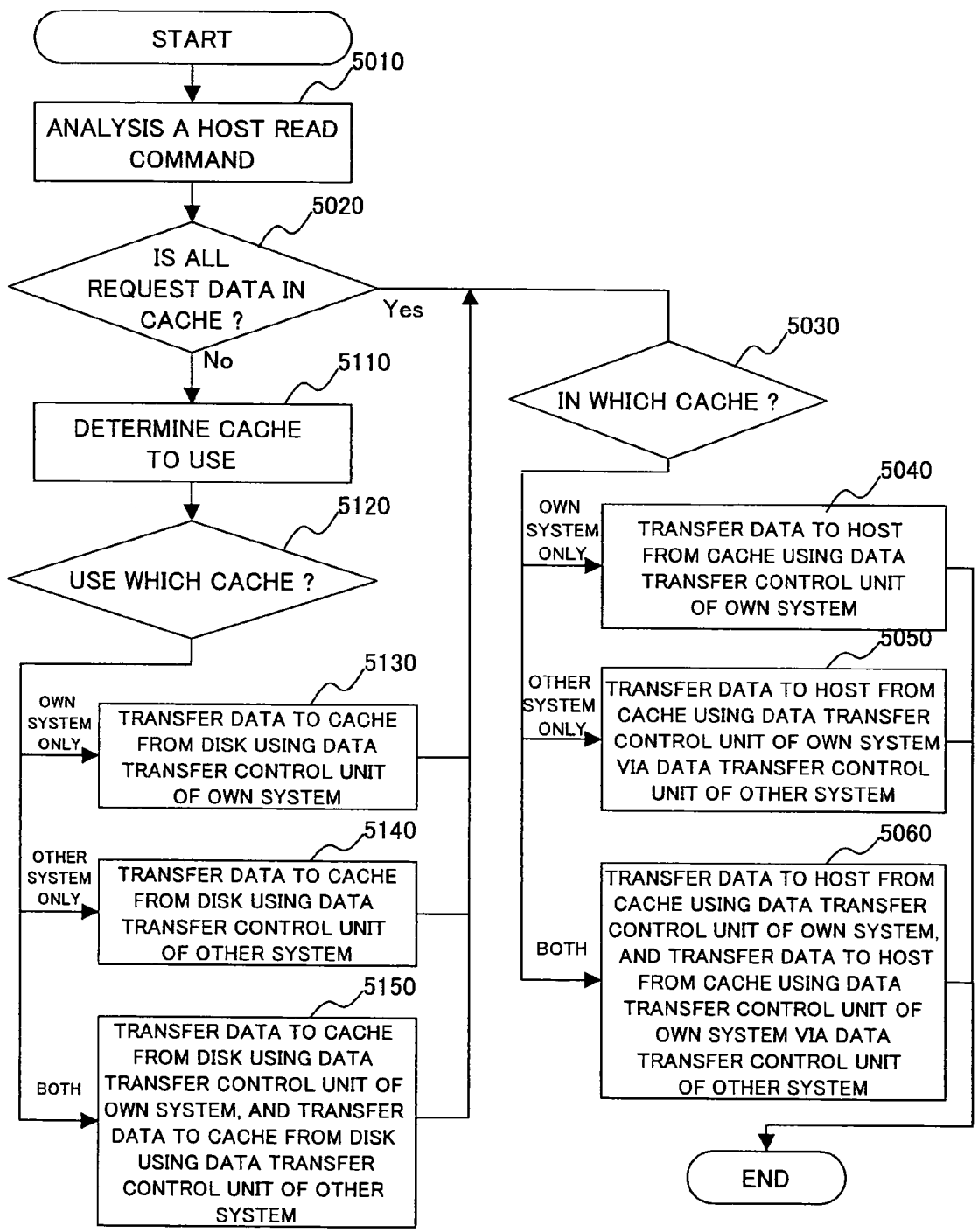
FIG. 7 is a flowchart of data read processing according to the embodiment of the present invention.

FIG. 7 is a flowchart of processing to read the data according to the embodiment of the present invention.

The disk array control program 2051 analyzes the content of the data read request (host read command) which the host input/output control unit 11 receives from the hosts 501, etc. In other words, a block address and amount are extracted from the header of the data relevant to the read request, and the block address of the data to be read is calculated using the block address and the amount in the header (5010).

Then, referring to the cache memory 1 management information 2011 and the cache memory 2 management information 2021, a comparison is made between the block address of the data which will be read and the block address of the cache data stored in the cache memory to judge whether all the data relating to the request (all the block addresses) are stored in the cache memories 21, 22 (5020).

When all the data relating to the request are stored in the one of the cache memories 21, 22, it is not necessary to read the data from the disk. Therefore, the CPU 31 determines which cache memory the data is stored in referring to the cache memory 1 management information 2011 and the cache memory 2 management information (5030).

When the result indicates that all the data relevant to the request is stored in the cache memory 21 of disk array control unit 101 of the same system, the data transfer control unit 41 (the data transfer control program 2031) identifies the segment where the data relevant to the request is stored, and reads the relevant data from the cache memory 21 of its own system, and transfers the data to the host 501 (5040).

Alternatively, when all the data relevant to the request is stored in the cache memory 22 of the other disk array control unit 102, the data transfer control unit 41 requests the data transfer control unit 42 of the other system to read the data from the cache memory 22. The data transfer control unit 42 (the data transfer control program 2032) identifies the segment where the data relevant to the request is stored and reads the relevant data from the cache memory 22 of the other system, and sends this to the data transfer control unit 41 via the disk array control unit communication path 91. The data transfer control unit 41 transfers the data transferred from the data transfer control unit 42 to the host 501 (5050).

Further, in a case where the data relevant to the request is divided and stored in both the cache memory 21 of its own disk array control unit 101 and the cache memory 22 of the other disk array control unit 102, the data transfer control unit 41 identifies the segment where the data relevant to the request is stored, and reads the relevant data from the cache memory 21 of its own system. Furthermore, the data transfer control unit 41 requests the data transfer control unit 42 of the other system to read the data from the cache memory 22. The data transfer control unit 42 identifies the segment where the data relevant to the request is stored, reads the relevant data from the cache memory 22 of the other system, and sends the data to the data transfer control unit 41 via the disk array control unit communication path 91. The data transfer control unit 41 synthesizes the data read from the cache memory 21 and the data transferred from the data transfer control unit 42, and transfers the data to the host 501 (5060).

On the other hand, when even a portion of the data relevant to the request is not stored in the cache memories 21, 22, the data must be read from the disk. Therefore, the CPU 31 references the cache memory management information 2011, 2021, and identifies the empty capacity in each cache memory 21, 22. This empty capacity can be calculated the number of empty queues in the cache memory management information 2011, 2021, but it is also possible to provide an empty capacity counter in advance. Then, the CPU 31 determines in which cache memory the data read from the disks is stored temporarily (5110).

In order to determine the cache memory to store the data, a possible method can be adopted in which priority is given to select the cache memory 21 in the same system, and to select the cache memory such that the data is not divided and stored into multiple cache memories. Furthermore, it is also possible to compare the access performance of the cache memory 21 in the same system and the cache memory 22 in the other system, and select the cache memory with better access performance.

As the result of the comparison, when the cache memory 21 of the disk array control unit 101 in the same system has more empty capacity than the amount of data to be read, all of the data relevant to the request can be stored in the cache memory 21 of the same system. Therefore, the data transfer control unit 41 writes the data read from the disk into the cache memory 21 of its own system (5130).

Furthermore, when the cache memory 21 of the same system does not have more empty capacity than the amount of the data to be read, and the cache memory 22 of the other disk array control unit 102 has more empty capacity than the amount of the data to be read, then all of the data relevant to the request can be stored in the cache memory 22 of the other system. Therefore, the data transfer control unit 41 requests the data transfer control unit 42 of the other system that the data be read from the disk. The data transfer control unit 42 writes the data read from the disk into the cache memory 22 (5140).

Furthermore, when neither the cache memory 21 in the same system nor the cache memory 22 in the other system has more empty capacity than the amount of the data to be read, and the sum of the empty capacity in the cache memory 21 in the same system and the cache memory 22 in the other system is greater than the amount of the data to be read, the data relevant to the request is divided and stored into the cache memory 21 in the same system and the cache memory 22 in the other system. Therefore, the data transfer control unit 41 writes the data read from the disk to the cache memory 21 of its own system. Furthermore, the data transfer control unit 41 requests the data transfer control unit 42 that the data be read from the disk. The data transfer control unit 42 writes the data read from the disk into the cache memory 22 (5150).

At this time, the data transfer control unit 41 reads from the disk an amount of data corresponding to the empty capacity in the cache memory 21 of its own system, and the data transfer control unit 42 reads from the disk an amount of data corresponding to the empty capacity in the cache memory 22.

When the data that was read from the disk finishes being written to the cache memories 21, 22, the processing goes to processing 5030 in order to transfer the data that was written to the cache memories 21, 22 to the host.

In the data read processing explained above, processing 5010 is executed by the disk array control program 2051. Furthermore, processing 5020 and 5030 and processing 5110 and 5120 are executed by the cache memory control program. Furthermore, processing 5040 to 5060 and processing 5130 to 5150 are executed by the data transfer control programs 2031, 2032.

Figure 8:
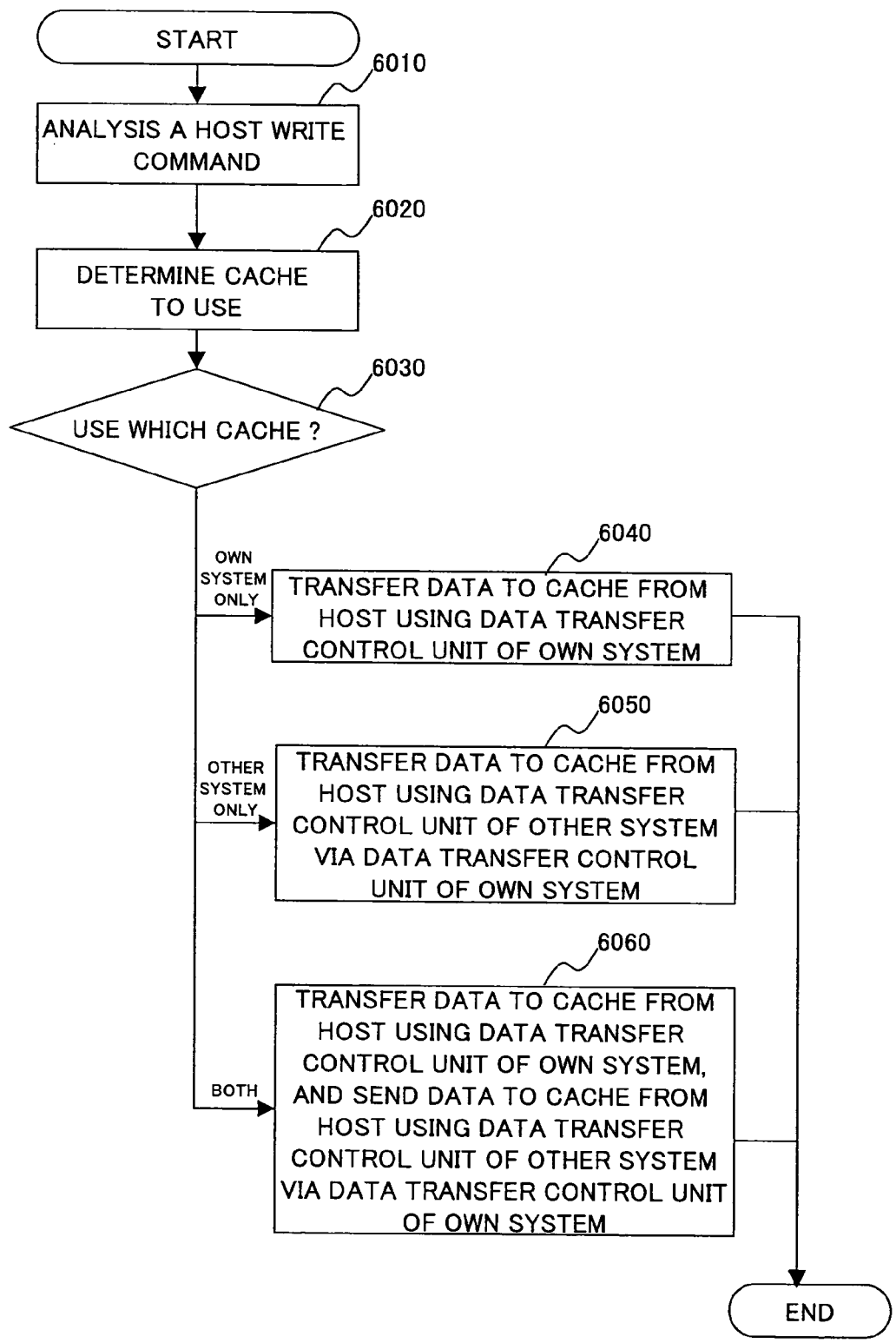
FIG. 8 is a flowchart of data write processing according to the embodiment of the present invention.

FIG. 8 is a flowchart of data write processing, according to the embodiment of the present invention.

The data write request (host write command) which the host input/output control unit 11 receives from the hosts 501, etc. is analyzed by the disk array control program 2051, and the amount of the data that is relevant to the write request is extracted from the write request (6010).

Then, since the data that will be written to the disk must be stored in the cache memory 21, 22, the CPU 31 referring to the cache memory management information 2011, 2021, and identifies the empty capacity in each cache memory 21, 22. Then, the CPU 31 determines which cache memory to temporarily store the data that will be written (6020).

In order to determine the cache memory to store the data, a possible method can be adopted in which priority is given to select the cache memory 21 in the same system, and to select the cache memory such that the data is not divided into multiple cache memories. Furthermore, it is also possible to compare the access performance of the cache memory 21 in the same system and the cache memory 22 in the other system, and select the cache memory with better access performance.

As the result of the comparison, when the cache memory 21 of the disk array control unit 101 in the same system has more empty capacity than the amount of data to be written, all of the data relevant to the request can be stored in the cache memory 21 of the same system. Therefore, the data transfer control unit 41 (the data transfer control program 2031) identifies the segment to store the data, and writes the data transferred from the host into the cache memory 21 of its own system (6040).

Furthermore, when the cache memory 21 of the same system does not have more empty capacity than the amount of the data to be written, and the cache memory 22 of the other disk array control unit 102 has more empty capacity than the amount of the data to be written, then all of the data relevant to the request can be stored in the cache memory 22 of the other system. Therefore, the data transfer control unit 41 transfers the data transferred from the host to the data transfer control unit 42 of the other system, and requests that the data be written into the cache memory 42. The data transfer control unit 42 identifies the segment to store the data, and writes the data transferred from the data transfer control unit 41 into the cache memory 22 (6050).

Furthermore, when neither the cache memory 21 in the same system nor the cache memory 22 in the other system has more empty capacity than the amount of the data to be written, and the sum of the empty capacity in the cache memory 21 in the same system and the cache memory 22 in the other system is greater than the amount of the data to be written, the data relevant to the request is divided and stored into the cache memory 21 in the same system and the cache memory 22 in the other system. Therefore, the data transfer control unit 41 identifies the segment where the data is to be stored, and writes the data transferred from the host to the cache memory 21 of its own system. Furthermore, the data transfer control unit 41 transfers a portion of the data transferred from the host to the data transfer control unit 42 in the other system, and requests to write the data into the cache memory 22. The data transfer control unit 42 identifies the segment to store the data, and writes the data transferred from the data transfer control unit 41 into the cache memory 22 (6060).

Figure 9:
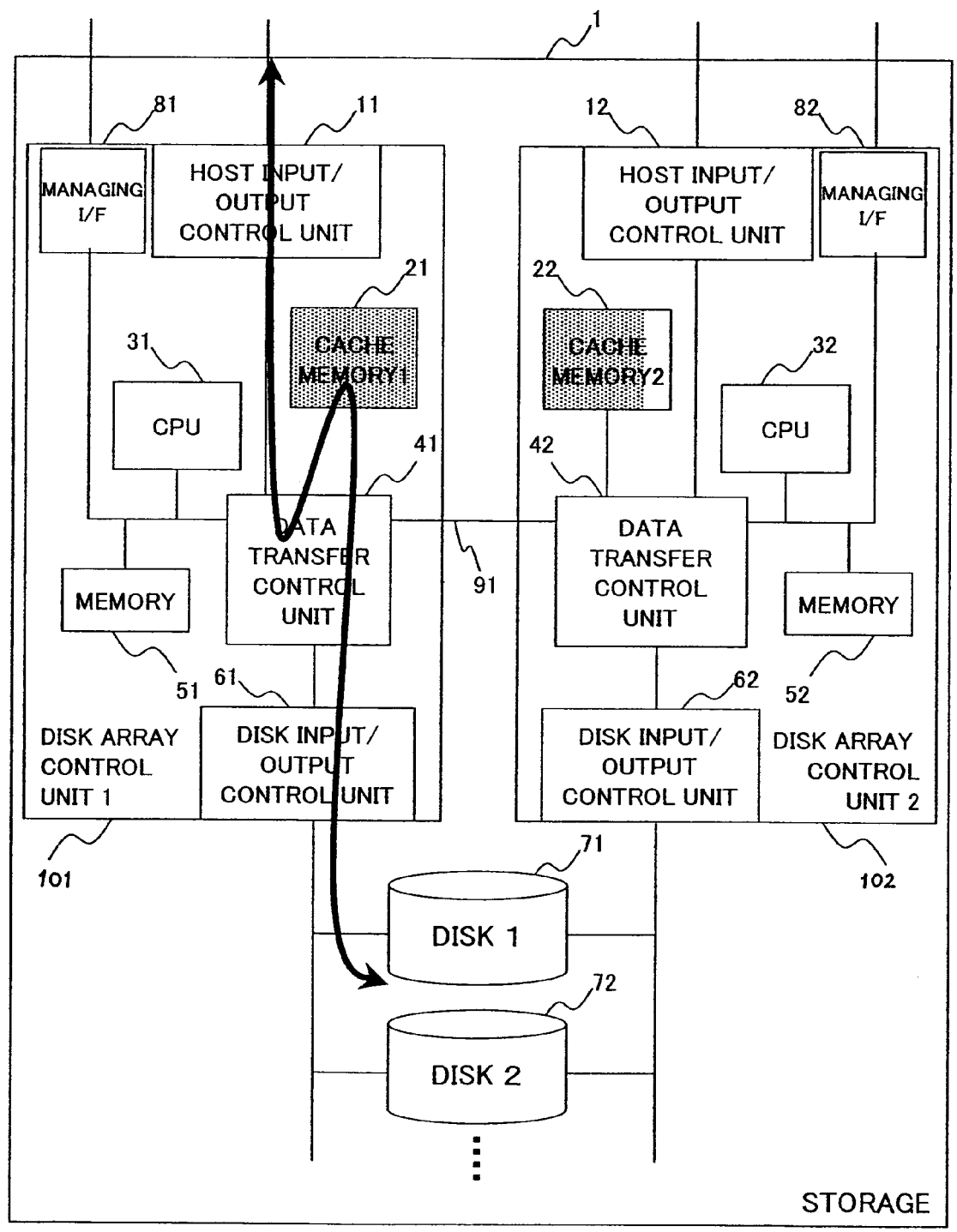
FIG. 9 is an explanatory diagram of a disk access path of the storage system according to the embodiment of the present invention.
Figure 10:
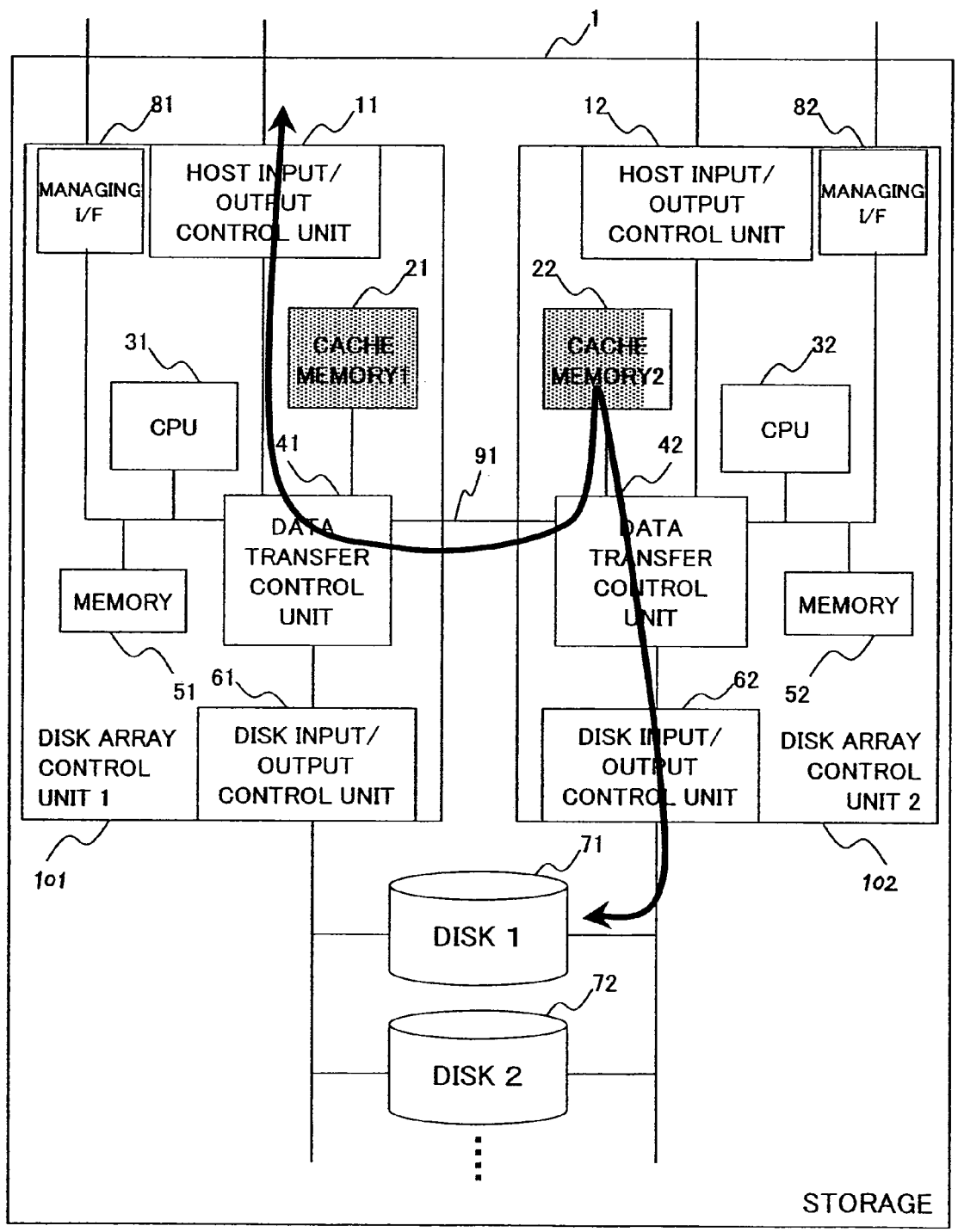
FIG. 10 is an explanatory diagram of another disk access path of the storage system according to the embodiment of the present invention.

FIGS. 9 and 10 are diagrams explaining disk access paths of the storage system, according to the embodiment of the present invention. FIG. 9 shows a normal path.

The data write request from the host 501, etc. is received by the host input/output control unit 11 and is sent via the data transfer control unit 41 to the cache memory 21, and the write data is temporarily stored in the cache memory 21. Then, when the data is stored in the cache memory 21, completion of the write processing is notified to the host that requested the writing of the data. At the same time (or at any subsequent timing), the data transfer control unit 41 writes the data to the disk 71, etc.

On the other hand, the data read request from the host 501, etc. is received by the host input/output control unit 11, and is sent via the data transfer control unit 41 to the disk 71, etc. Then, the data that is read from the disk is sent via the data transfer control unit 41 to the cache memory 21, where the data that was read is temporarily stored. Then, the data written in the cache memory 21 is sent to the host that requested to read the data.

The foregoing is an explanation of the operations of the disk array control unit 101, but the disk array control unit 102 also performs similar operations to read and write data.

In other words, as shown in FIG. 9, when the normal path is used, only the disk array control unit 1 (or the disk array control unit 2) reads and writes the data.

FIG. 10 shows the path for using the cache memory of the disk array control unit 2 (i.e., the cache memory of the other system).

The data write request from the hosts 501, etc. is received by the host input/output control unit 11, and is sent from the data transfer control unit 41 through the disk array control unit communication path 91 to the data transfer control unit 42. The data transfer control unit 42 sends the data to the cache memory 22, and the data which will be written is temporarily stored in the cache memory 22. Then, when this data is stored in the cache memory 22, completion of the write processing is notified to the host that requested the writing of the data. This completion notification is sent by the reverse path traveled by the data write request. At the same time (or at any subsequent timing) the data transfer control unit 42 writes the data to the disk 71, etc.

On the other hand, the data read request from the host 501, etc. is received by the host input/output control unit 11, and is sent from the data transfer control unit 41 through the disk array control unit communication path 91 to the data transfer control unit 42. The data transfer control unit 42 sends this data to the disk 71, etc. Then, the data that is read from the disk is sent via the data transfer control unit 42 to the cache memory 22, where the data that was read is temporarily stored. Then, the data written into the cache memory 22 is sent to the host that requested that the data be read.

The foregoing is an explanation of the operations of the disk array control unit 11, but the disk array control unit 21 also performs similar operations to use the cache memory of the disk array control unit 1 to read and write data.

It should be noted that, whether to use the normal path shown in FIG. 9, or the path shown in FIG. 10 for using the cache memory of the other system, is determined by the status of each cache when the CPU of the disk control unit performs the command processing. A method for making this determination is as explained with respect to FIG. 7 and FIG. 8.

Figure 11:
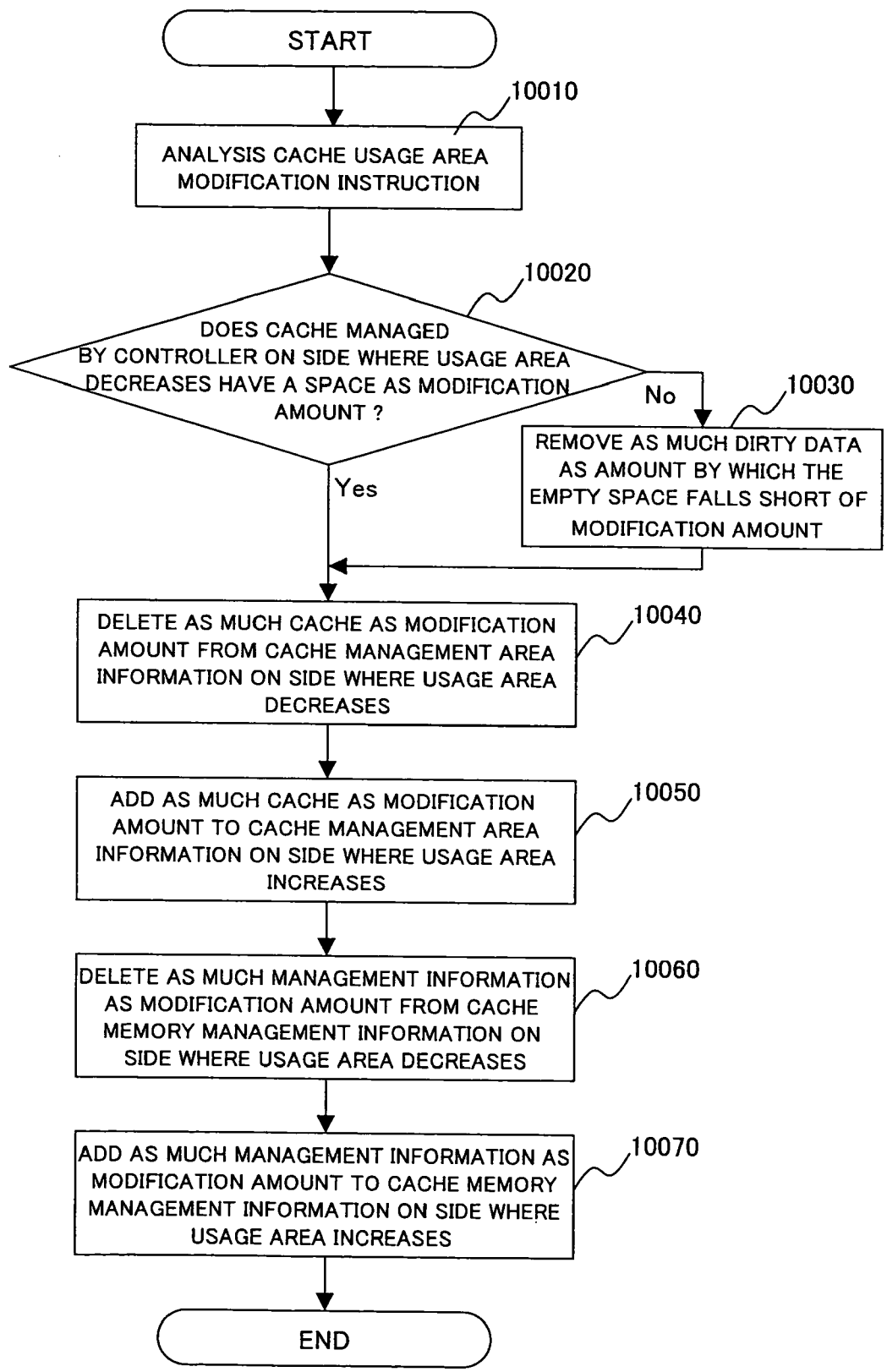
FIG. 11 is a flowchart of cache memory assignment modification processing, according to the embodiment of the present invention.

FIG. 11 is a flowchart showing processing to modify the cache memory assignments according to the embodiment of the present invention.

First, a cache usage area modification instruction, which is inputted using a management screen (FIG. 12) of the managing host 521, is interpreted by the cache memory control program 2061 (or 2062) (10010).

Then, the empty capacity of the cache memory managed by the disk array control unit whose usage area decreases is compared with the modification amount, and judge whether the empty capacity in the cache memory whose usage area decreases is insufficient (10020). As the result of judgment, when the empty capacity of the cache memory managed by the disk array control unit where the used area decreases is below the modified amount, it is determined that the empty capacity is insufficient (falls short), and the amount by which dirty data falls short of the modified amount is written to the disks 71, etc. (10030).

Then, cache memory segments equal to the modification amount are deleted from the cache area management information of the disk array control unit side where the usage area decreases (10040). Then, cache memory segments equal to the modification amount are added to the cache area management information on the disk array control unit side where the usage area increases (10050).

Then, as much management information as the modification amount is deleted from the cache area management information of the disk array control unit where the usage area decreases (10060). Then, management information is added to the cache memory management information of the disk array control unit where the usage area increases (10070).

Figure 12:
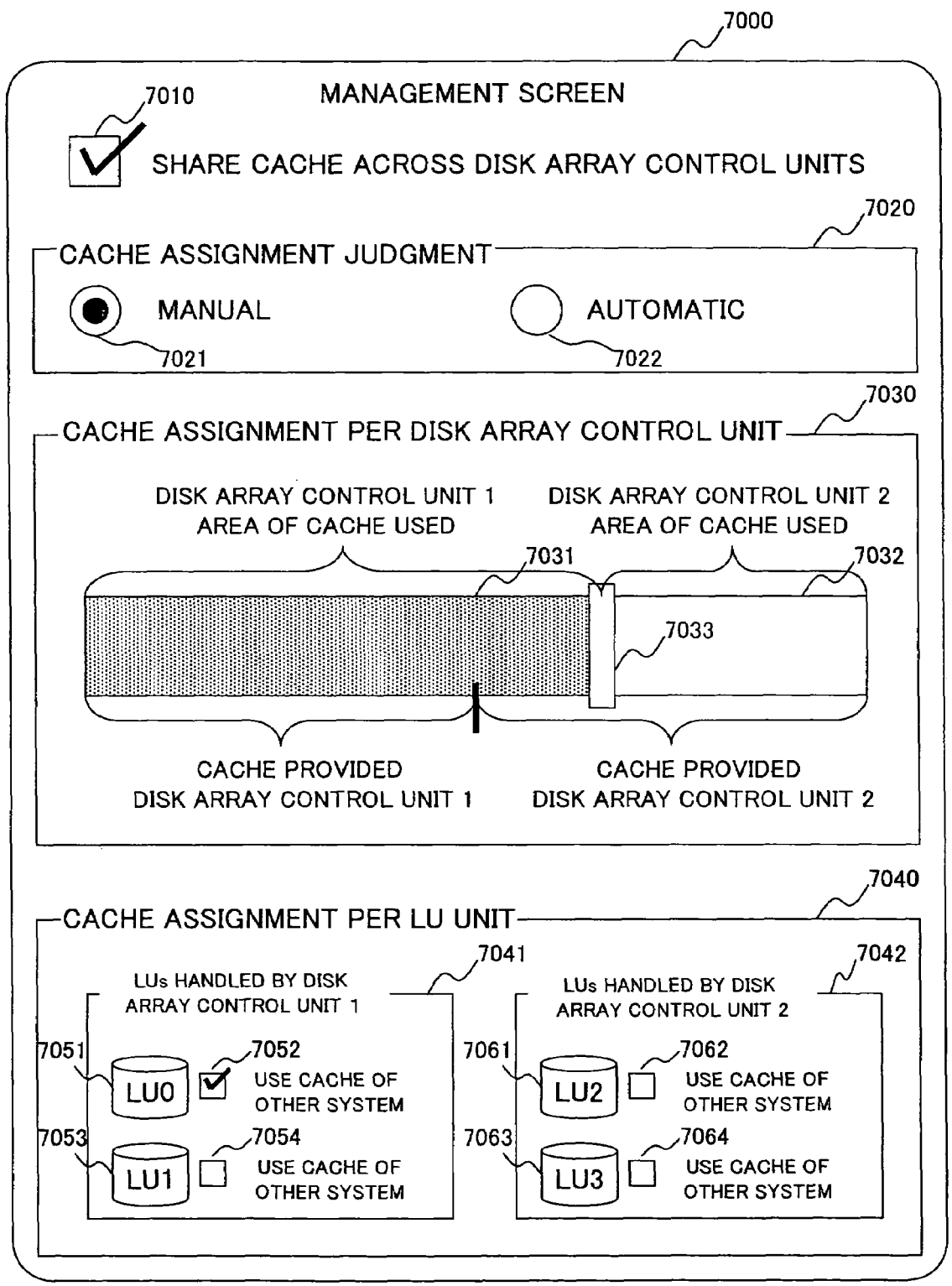
FIG. 12 is an explanatory diagram of a cache memory management screen according to the embodiment of the present invention.

FIG. 12 is an explanatory diagram of the cache memory management screen according to the embodiment of the present invention.

A management screen 7000 provides with a field (check box) 7010 for selecting whether or not to share the cache memory across the disk array control units. Checking in the check box 7010 enables the disk array control unit to use the cache memory of the other disk array control unit, and lets the other columns in this screen be selected.

Further the management screen 7000 provides with a selection field 7020 for selecting whether to determine the cache memory assignment automatically or not to determine automatically (i.e., to set manually). Only one of radio buttons 7021 and 7022 in the selection field 7020 can be selected, and the selected method (automatic or manual) is used to determine the cache memory assignment.

Further the management screen 7000 provides with a field 7030 for setting the cache memory assignment per disk array control unit. A bar 7033 is provided in the field 7030 indicates a logical boundary of the cache memory. That is, the left side of the bar 7033 is the area of the cache memory used by the disk array control unit 1, and the right side is the area of the cache memory used by the disk array control unit 2. The bar 7033 can move left and right. Movement of the bar 7033 changes the segments registered in the disk array control unit 1-side cache area management information 2001, and the disk array control unit 2-side cache area management information 2002. Thus, in the cache memory, the area used by the disk array control unit 1 and the area used by the disk array control unit 2 are changeable. It should be noted that, a lower portion of the field 7030 shows the capacity of the cache memory provided to the disk array control unit 1, and the capacity of the cache memory provided to the disk array control unit 2.

Furthermore, the management screen 7000 provides a field 7040 for setting the assignment of the cache memory per logical unit (LU). That is, putting a check in a check box 7052, 7054 changes the LU registered in the cache memory 2 usable LU table 9012 for the disk array control unit 1, permitting the corresponding LU to use the cache memory of the other system. Similarly, putting a check in a check box 7062, 7064 changes the LU registered in the cache memory 1 usable LU table of the disk array control unit 2, permitting the corresponding LU to use the cache memory of the other system.

Figure 13:
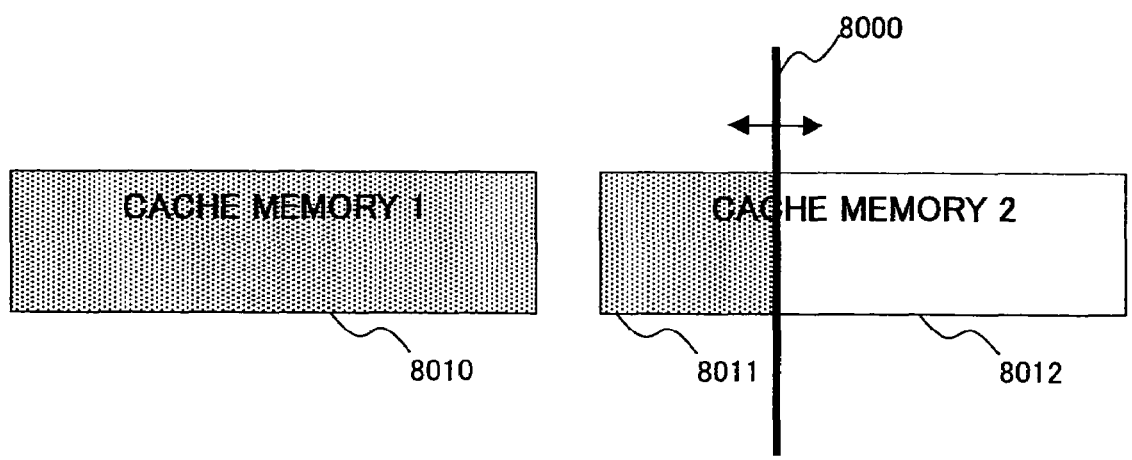
FIG. 13 is an explanatory diagram of changing area inside the cache memory according to the embodiment of the present invention.

FIG. 13 is a diagram for explaining changing of the area in the cache memory, based on change in the assignments of the cache memory, according to the embodiment of the present invention.

By moving a position of the bar 7033 provided to the field 7030 for setting the cache memory assignment in the management screen 7000, the segment registered in the disk array control unit 1-side cache area management information 2001 and the disk array control unit 2-side cache area management information 2002 can be changed, and a logical boundary 8000 of the cache memory can be changed. That is, the left side of the logical boundary 8000 is the areas 8010, 8011 in the cache memory used by the disk array control unit 1, and the right side of the logical boundary 8000 is the area 8012 in the cache memory used by the disk array control unit 2.

As described above, according to the embodiment, the disk array control unit 101 provides with the host input/output control unit 11 that sends and receives data and control signals to/from the host connected to the storage system 1, the disk input/output control unit 61 that sends and receives data and control signals to/from the disks 71, etc., and the data transfer control unit 41 that controls data transfer between the host input/output control unit 11 and the disk input/output control unit 61. The disk array control unit 102 provides with the host input/output control unit 12 that sends and receives data and control signals to/from the host connected to the storage system 1, the disk input/output control unit 62 that sends and receives data and control signals to/from the disks 71, etc., and the data transfer control unit 42 that controls data transfer between the host input/output control unit 12 and the disk input/output control unit 62. There is also provided the disk array control unit communication path 91, which connects between the data transfer control unit 41 and the data transfer control unit 42 to communicate each other. The data transfer control unit 41 selectively sets either the first path through the host input/output control unit 11, the data transfer control unit 41, and the disk input/output control unit 61, or the second path through the host input/output control unit 11, the data transfer control unit 41, the disk array control unit communication path 91, the data transfer control unit 42, and the disk input/output control unit 62, and then processes the data input/output request from the host. That is, when using the cache memory of the other system, the path through the other data transfer control unit (through two data transfer control units) is used to transfer the data. Therefore, the data can be transferred between the disk array control units, making it possible to use a cache memory with a larger capacity than that of the cache memory provided to the disk array control unit.

Furthermore, the memory 51 stores not only the management information of the data stored in the area of the cache memory 21 that can be accessed from the data transfer control unit 41, but also the management information of the data stored in the area of the cache memory 22 that can be accessed from the data transfer control unit 41. Therefore, all the management information relating to the areas controlled by that disk array control unit itself can be stored in the unit's own memory, thus enabling high-speed access to the cache memory.

Furthermore, in the above-mentioned known technique disclosed in JP 2003-162377 A, the same logical unit could only be accessed from one disk array control unit (controller). However, in the present invention, the same logical unit can be accessed from multiple disk array control units. In other words, the above-mentioned conventional technique moves the structural information of the logical unit that will be moved from the source controller to the destination controller. In the present invention, the structural information does not move in this way. Rather, by providing the disk array control unit communication path 91, the same logical unit can be accessed from both the disk array control unit 101 and the disk array control unit 102. Then, by using this path that goes through the disk array control unit of the other system, the disk array control unit 101 can use the cache memory provided to the disk array control unit 102.

While the present invention has been described in detail and pictorially in the accompanying drawings, the present invention is not limited to such detail but covers various obvious modifications and equivalent arrangements, which fall within the purview of the appended claims.

What is claimed is:

1. A storage system comprising a first disk array control unit, a second disk array control unit, and a plurality of disks, the first disk array control unit comprising a first CPU, a first host input/output control unit that sends and receives data and control signals to/from a host connected to the storage system, a first disk input/output control unit that sends and receives data and control signals to/from the disks, and a first data transfer control unit that controls data transfer between the first host input/output control unit and the first disk input/output control unit, the second disk array control unit comprising a second CPU, a second host input/output control unit that sends and receives data and control signals to/from the host connected to the storage system, a second disk input/output control unit that sends and receives data and control signals to/from the disks, and a second data transfer control unit that controls data transfer between the second host input/output control unit and the second disk input/output control unit, the storage system further comprising a disk array control unit communication path connecting between the first data transfer control unit and the second data transfer control unit to communicate with each other, the first data transfer control unit selecting one of a first path through the first host input/output control unit, the first data transfer control unit, and the first disk input/output control unit, and a second path through the first host input/output control unit, the first data transfer control unit, the disk array control unit communication path, the second data transfer control unit, and the second disk input/output control unit, and processing a data input/output request from the host using the selected path;

wherein:

the first disk array control unit comprises a first cache memory that temporarily stores data sent and received between the first host input/output control unit and the first disk input/output control unit, a first memory that stores a control program executed by the first CPU, and a first cache memory control unit;

the second disk array control unit comprises a second cache memory that temporarily stores data sent and received between the second host input/output control unit and the second disk input/output control unit;

the first disk input/output control unit analyzes a data read request received from the host connected to the first host input/output control unit;

the first cache memory control unit determines which cache memory the data relevant to the request is stored in; and the first data transfer control unit performs the following:

when all the data relevant to the request is stored in the first cache memory, uses the first path and transfers the data from the first cache memory to the first host input/output control unit; and when all the data relevant to the request is stored in the second cache memory, uses the second path and requests the second data transfer control unit to read the data from the second cache memory using the second path, and transfers the data transferred from the second data transfer control unit to the first host input/output control unit;

wherein the first data transfer control unit performs the following:

when the data relevant to the request is divided and stored in both the first cache memory and the second cache memory, uses the first path, identifies a storage location of the data relevant to the request, and obtains the relevant data; and uses the second path, requests the second data transfer control unit to obtain data from the second cache memory, and transfers the data obtained using the first path and the data obtained using the second path to the first host input/output control unit.

2. A storage system comprising a first disk array control unit, a second disk array control unit, and a plurality of disks, the first disk array control unit comprising a first CPU, a first host input/output control unit that sends and receives data and control signals to/from a host connected to the storage system, a first disk input/output control unit that sends and receives data and control signals to/from the disks, and a first data transfer control unit that controls data transfer between the first host input/output control unit and the first disk input/output control unit, the second disk array control unit comprising a second CPU, a second host input/output control unit that sends and receives data and control signals to/from the host connected to the storage system, a second disk input/output control unit that sends and receives data and control signals to/from the disks, and a second data transfer control unit that controls data transfer between the second host input/output control unit and the second disk input/output control unit, the storage system further comprising a disk array control unit communication path connecting between the first data transfer control unit and the second data transfer control unit to communicate with each other, the first data transfer control unit selecting one of a first path through the first host input/output control unit, the first data transfer control unit, and the first disk input/output control unit, and a second path through the first host input/output control unit, the first data transfer control unit, the disk array control unit communication path, the second data transfer control unit, and the second disk input/output control unit, and processing a data input/output request from the host using the selected path;

wherein:

the first disk array control unit comprises a first cache memory that temporarily stores data sent and received between the first host input/output control unit and the first disk input/output control unit, and a first memory that stores a control program executed by the first CPU, and a first cache memory control unit;

the second disk array control unit comprises a second cache memory that temporarily stores data sent and received between the second host input/output control unit and the second disk input/output control unit;

the first disk input/output control unit analyzes a data write request received from the host connected to the first host input/output control unit;

the first cache memory control unit determines into which cache memory to write the data relevant to the request; and the first data transfer control unit performs the following:

when the data relevant to the request can be stored in the first cache memory, and transfers the data relevant to the request into the first cache memory using the first path; and when the data relevant to the request cannot be stored in the first cache memory and can be stored in the second cache memory, and transfers the data relevant to the request into the second cache memory using the second path.

3. The storage system according to claim 2, wherein the first data transfer control unit performs the following:
when the data relevant to the request can be stored in neither the first cache memory nor the second cache memory, and can be divided and stored in the first cache memory and the second cache memory,
transfers a portion of the data relevant to the request to the first cache memory using the first path; and
transfers the other portion of the data relevant to the request to the second cache memory using the second path.

4. The storage system according to claim 2, wherein the first cache memory control unit compares an amount of the data relevant to the request and at least one of an empty capacity in the first cache memory and an empty capacity in the second cache memory, and determines in which cache memory to store the amount of the data relevant to the request; and
when the amount of the data relevant to the request exceeds the empty capacity in the first cache memory and is equal to or smaller than the empty capacity in the second cache memory, the first data transfer control unit transfers the data relevant to the request to the second cache memory using the second path.

5. The storage system according to claim 2, wherein:
the first cache memory control unit compares performance of the cache memories, and determines in which cache memory to store the amount of the data relevant to the request; and
when the performance of the second cache memory is superior to the performance of the first cache memory, and the amount of the data relevant to the request is equal to or smaller than the empty capacity in the second cache memory, the first data transfer control unit transfers the data transferred from the host to the second cache memory.

6. A storage system comprising a first disk array control unit, a second disk array control unit, and a plurality of disks,
the first disk array control unit comprising a first CPU, a first host input/output control unit that sends and receives data and control signals to/from a host connected to the storage system, a first disk input/output control unit that sends and receives data and control signals to/from the disks, and a first data transfer control unit that controls data transfer between the first host input/output control unit and the first disk input/output control unit,
the second disk array control unit comprising a second CPU, a second host input/output control unit that sends and receives data and control signals to/from the host connected to the storage system, a second disk input/output control unit that sends and receives data and control signals to/from the disks, and a second data transfer control unit that controls data transfer between the second host input/output control unit and the second disk input/output control unit,
the storage system further comprising a disk array control unit communication path connecting between the first data transfer control unit and the second data transfer control unit to communicate with each other,
the first data transfer control unit selecting one of a first path through the first host input/output control unit, the first data transfer control unit, and the first disk input/output control unit, and a second path through the first host input/output control unit, the first data transfer control unit, the disk array control unit communication path, the second data transfer control unit, and the second disk input/output control unit, and processing a data input/output request from the host using the selected path;
wherein:
a plurality of logical units are set on the disks;
a cache memory 2 usable LU table, in which logical units that can serve as a read source of data to be written to the second cache memory are registered, is set in the first memory; and
the first data transfer control unit controls such that data read from the logical units registered in the cache memory 2 usable LU table can be transferred to the second cache memory, and controls such that data read from the logical units not registered in the cache memory 2 usable LU table is not transferred to the second cache memory.

* * * * *